United States Patent [19]

Chu et al.

[11] Patent Number: 5,057,203

[45] Date of Patent: Oct. 15, 1991

[54] ULTRASTABLE Y CONTAINING FRAMEWORK GALLIUM

[75] Inventors: Cynthia T. Chu, Princeton Junction; Randall D. Partridge, W. Trenton, both of N.J.; Suzanne E. Schramm, Newton, Pa.

[73] Assignee: Mobil Oil Corporation, Fairfax, Va.

[21] Appl. No.: 519,966

[22] Filed: May 7, 1990

[51] Int. Cl.$^5$ .................. C10G 11/02; C10G 35/06
[52] U.S. Cl. .................. 208/46; 208/120; 208/135
[58] Field of Search .................. 208/46, 120, 135

[56] References Cited

U.S. PATENT DOCUMENTS

| | | | |
|---|---|---|---|
| 4,520,120 | 5/1985 | Mitchell et al. | 502/68 |
| 4,584,091 | 4/1986 | Pine | 502/64 |
| 4,906,353 | 3/1990 | Breckenridge et al. | 208/138 |

OTHER PUBLICATIONS

Anderson, "Calculation of Research Octane..." *Journal of the Institute of Petroleum*, vol. 58, No. 560 (1972).
*Journal of Catalysis* 106, pp. 287-291 (1987).
Taramasso, "Molecular Sieve Borosilicates", pp. 40-48.
Zulfugarov, "Synthesis of Gallosilicate and Alumogermanate Zeolites..." Structure and Reactivity of Modified Zeolites, pp. 167-174 (1984).
D. W. Breck, *Zeolite Molecular Sieves*, John Wiley & Sons, pp. 321-322.

Primary Examiner—Curtis R. Davis
Attorney, Agent, or Firm—Alexander J. McKillop; Charles J. Speciale; Marina V. Schneller

[57] ABSTRACT

The invention relates to framework gallium containing ultrastable Y having a framework (silica:alumina+gallium oxide) $SiO_2/(Al_2O_3+Ga_2O_3)$ mole ratio of 18:1 which contains at least 2.2% framework gallium. Moreover, the invention includes use of the framework gallium containing ultrastable Y in hydrocarbon conversion processes, such as reforming, catalytic cracking and aromatization.

13 Claims, 2 Drawing Sheets

ULTRASTABLE Y CONTAINING FRAMEWORK GALLIUM

FIELD OF THE INVENTION

The invention relates to framework gallium containing ultrastable Y zeolites, having characteristic X-ray powder diffraction patterns, to their synthesis and to their use as catalysts. These compositions can be used in hydrocarbon conversions, including catalytic cracking, reforming and aromatizations.

BACKGROUND OF THE INVENTION

Naturally occurring and synthetic zeolites have been demonstrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by structure of the crystal. The zeolites are referred to as "molecular sieves" because the uniform pore size of a zeolite material may allow it to selectively adsorb molecules of certain dimensions and shapes.

By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula

$M_{2/n}O.Al_2O_3.xSiO_2.yH_2O$

In the empirical formula, x is equal to or greater than 2, since $AlO_4$ tetrahedra are joined only to $SiO_4$ tetrahedra, and n is the valence of the cation designated D. M. Breck, ZEOLITE MOLECULAR SIEVES, John Wiley & Sons, New York., p. 5 (1974). In the empirical formula, the ratio of the total of silicon and aluminum atoms to oxygen atoms is 1:2. M was described therein to be sodium, potassium, magnesium, calcium, strontium and/or barium, which completes the electrovalence makeup of the empirical formula.

The prior art describes a variety of synthetic zeolites. These zeolites have come to be designated by letter or other convenient symbols, as illustrated by the zeolite. The silicon/aluminum atomic ratio of a given zeolite is often variable. Moreover, in some zeolites, the upper limit of the silicon/aluminum atomic ratio is unbounded. One example is ZSM-5. ZSM-5 is a member of a class of zeolites sometimes referred as medium pore zeolites. The pore sizes of medium pore zeolites range from about 5 to about 8 Angstroms. By comparison, zeolites referred to as large pore zeolites have pore sizes which are greater than 7 Angstroms.

The zeolite ZSM-5 is an example of a zeolite which has a silica:alumina ratio which can range up to infinity. Moreover, the zeolite ZSM-5 has been described as synthesized with elements other than silicon and aluminum in the framework.

The large pore zeolites, having pore sizes greater than about 7 Angstroms, include inter alia naturally occurring faujasite and synthetic zeolites such as zeolite X, L and Y. When, for example, the zeolite Y is dealuminated to increase the silica:alumina ratio of the as-synthesized zeolite, a change in the unit cell structure occurs. The efficacy of methods for dealumination of Zeolite Y varies. However, certain zeolite Y species on dealumination yield structures which are referred as ultrastable Y, which exhibits the same X-ray diffraction pattern as zeolite Y but which has a smaller cell structure. This ultrastable Y exhibits greater stability than its higher aluminum counterpart and different selectivity from that counterpart.

SUMMARY OF THE INVENTION

The invention is ultrastable Y (hereinafter USY) containing framework gallium. In accordance with the invention, the ultrastable Y has a silica:alumina ratio of at least 10:1 and a gallium content ranging from 0.1 to 5.0%.

The gallium containing USY is synthesized by steaming USY under a heating schedule with a temperature of at least 650° C. to produce USY having framework silica:alumina ratio of at least 30:1; then the steamed USY is treated with acid (e.g. at ambient temperatures) at a pH of less than 2.0. The acid treated intermediate can then be contacted with a soluble source of gallium at a pH of at least 8.

DETAILED DESCRIPTION OF THE INVENTION

Figure 1:
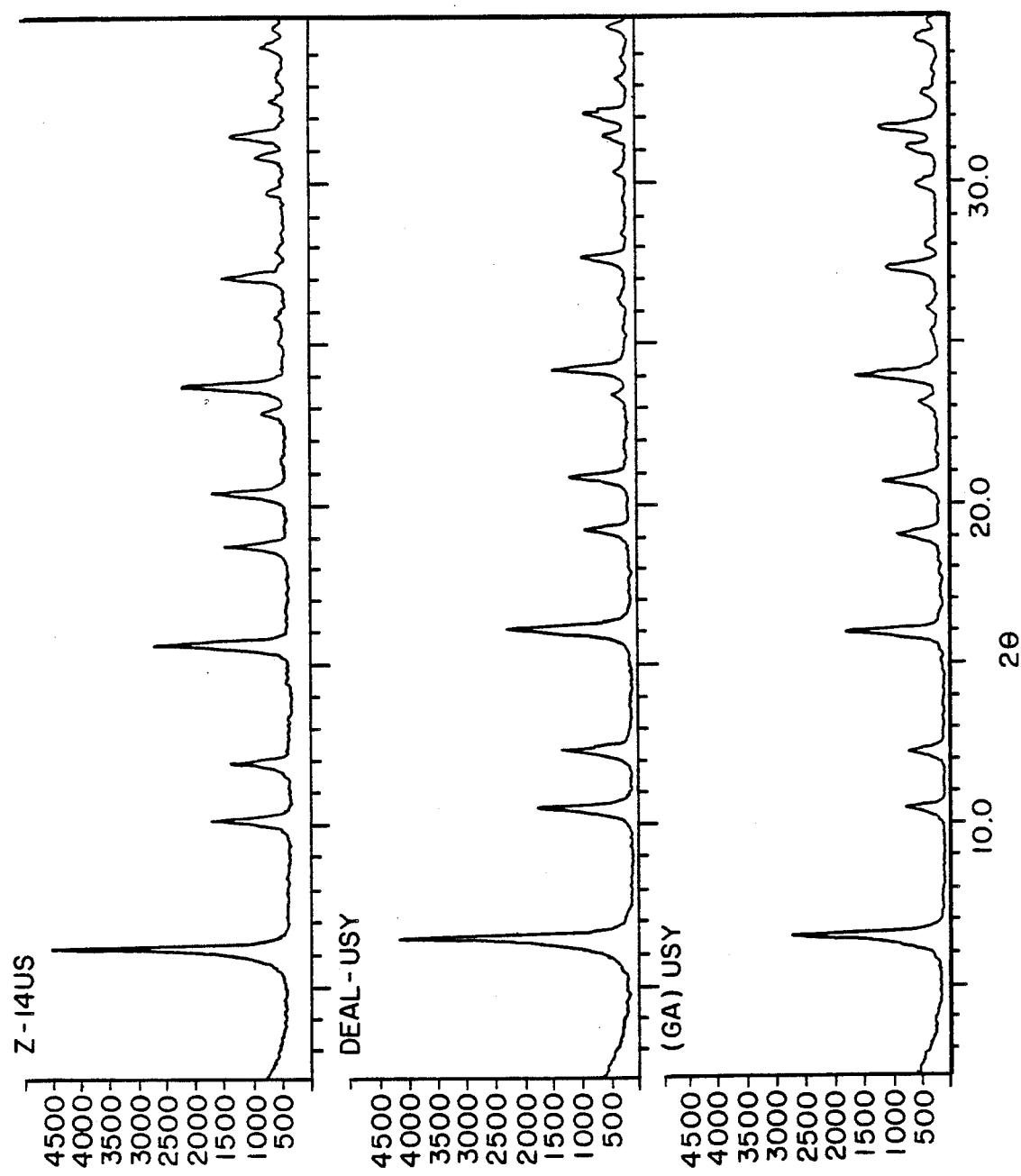
FIG. 1 is an X-ray diffraction pattern of the gallium USY and the parent materials.

In accordance with the invention, crystallinity of USY is maintained on gallium insertion into the framework thereof. In one embodiment the silica:alumina framework ratio of USY is greater than 60:1. In another embodiment, the silica:alumina ratio is greater than 90:1. In embodiments for synthesis thereof, described below gallium incorporation into the framework exceeded 20% of that available in the reagent source material.

Thus, the invention provides a method of synthesis which allows the high silica:alumina ratios in the USY and high gallium insertion percentages.

The reactant starting material for the synthesis can be ultrastable Y having a silica:alumina framework ratio of less than 10. Initial treatment to convert the USY to the acid form and to decrease the alkali metal content thereof is undertaken. Alkali metal content is reduced to a level of ≦0.5%. This is achieved by ammonium ion exchange of the cation sodium exchanged USY starting material, with subsequent calcination; the ammonium ion exchanged USY exhibits a higher alpha value than its precursor. Thereafter the calcined hydrogen form of USY is subjected to steaming.

Steaming of the USY, in accordance with the invention, is undertaken at a temperature of greater than 500° C., and preferably above 600° C. Most preferably steaming is undertaken at a temperature which is at the limits of temperature capacity of the commercially available steaming equipment, which, in experiments reported below, was about 650° C. One-hundred percent steam atmospheres were used below. Steaming was undertaken for a period of time effective, at those steaming temperatures to substantially increase the framework silica:alumina ratio of the USY, as measured after subsequent acid extraction. Although steaming at 500° C. will effect dealumination, to an extent of about 60%, steaming of the low sodium content USY and extraction in accordance with the invention can reduce the framework aluminum content to an extent which is 90% framework dealuminization. Between steaming and acid extraction, the steamed zeolite is subjected to ammonium ion exchange.

Acid extraction after steaming removes debris from the internal pore structure of the steamed USY. Although various mineral acids can be used, such as HCl, $H_2SO_4$, $HNO_3$ and the like, nitric acid is preferred for its compatibility with stainless steel equipment. Although elevated temperatures can be employed for acidic treatment of the steamed zeolite, in the experiments set forth below, the temperature was ambient temperature. The pH of the acid treatment is less than 2.0.

In order to maximize the extent of dealumination of the USY, after acid treatment, the steam and acidic treatment of the dealuminated USY is repeated. The dealuminated USY was subjected to steaming at a temperature of about at least 600° C. and then treated with a mineral acid under conditions described above. On steaming the dealuminated USY, the alpha value was determined and was substantially that alpha value of the zeolite after subsequent acid treatment of the twice dealuminated USY. In experiments reported below, the resulting USY had a silica:alumina ratio of greater than 100:1 which was a result corresponding to about 95% dealumination of the USY reactant having a silica:alumina ratio of 8.5.

Gallium insertion into the dealuminated USY framework is extremely efficient. That is, under the conditions described herein at least 92% of the gallium associated with the zeolite was inserted into the dealuminated USY framework. In order to insert gallium into the framework the dealuminated zeolite is treated with a soluble source of gallium at pH greater than 8.0. By way of example, readily available soluble sources of gallium include the nitrate and sulfate salts. Preferably, in accordance with the invention the soluble source of gallium is gallium sulfate. The exact water dilution factor of the soluble source of gallium is not critical. The gallium treatment of the large pore zeolite can result in incorporation of gallium into the zeolite framework in a position of tetrahedral substitution, or in exchange of gallium or in gallium impregnation of the zeolite. Preferably, the gallium is incorporated into the framework. The gallium treatment can be undertaken at temperatures ranging from ambient up to elevated temperatures, including heating under autogenous pressure to temperatures up to about 300° C. In accordance with the invention, the pH of the gallium treatment must be greater than 7, and preferably greater than about 8, to incorporate gallium into a tetrahedral position which has been depleted in the anionic species Si, Al, B, Ge (for example, aluminum which has been removed from the framework by steaming previous to gallium contact). When the zeolite contains aluminum as a framework element and it is desired to substitute gallium for said framework element the pH of gallium contact with the zeolite will be 10 or greater. It is anticipated that, in the absence of the soluble source of gallium, prolonged high pH conditions, with increased temperatures and/or increased contact times can result in framework destruction and literally dissolution of the zeolite.

After gallium treatment, the zeolite can be converted to the ammonium form by ammonium ion exchange. Aqueous solutions of ammonium cations are usually used to convert the zeolite to its ammonium form. Ammonium ion exchange can be undertaken at ambient temperature up to reflux temperatures more than one time; it also can be repeated at different temperatures. Prior to ammonium exchange the gallium treated zeolite may be washed free of reagents used in the gallium treatment step.

The source of the ammonium ion is not critical; thus the source can be an ammonium salt such as ammonium nitrate, ammonium sulfate, ammonium chloride, ammonium acetate and mixtures thereof. These reagents are usually in aqueous solutions; by way of illustration, aqueous solutions of $1N$ $NH_4NO_3$, $1N$ $NH_4Cl$ and $1N$ $NH_4Cl/NH_4OH$ have been used to effect ammonium ion exchange on these, and similar materials; the $NH_4OH$ may be used to keep the pH up and minimize hydronium ion exchange. The pH of the reaction mixture is generally maintained at 7 to 11, preferably at 8 to 10. Ammonium exchange may be conducted for a period of time ranging from about 0.5 to about 20 hours at a temperature ranging from ambient up to about 100° C. The ion exchange may be conducted in multiple stages.

After ammonium exchange, the ammonium exchanged zeolite can be treated to cause $NH_3$ evolution and conversion of the zeolite to its protonated form, sometimes referred to as its hydrogen form. This treatment can be simply a heat treatment at temperatures up to 800° C., preferably up to 600° C. In the examples below, the ammonium form was treated in air at 1° C./min to 538° C. and maintained at 538° C. for 4 hours.

Gallium incorporation into the framework was confirmed by elemental analysis coupled with thermogravimetric analysis and NMR. Gallium $-71$ MAS NMR spectra were obtained on a 200 MHz Spectrometer. No proton decoupling was used. Spectral signal/noise was enhanced with 200 Hz exponential line broadening. The chemical shifts are referenced to a solid sample of $Ga(NO_3)_3$.

Catalytic cracking activity is measured by the alpha value test which is a measure of the hexane cracking activity or acidity of the zeolite. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.16 $sec^{-1}$). The alpha Test is described in U.S. Pat. No. 3,354,078, in the Journal of Catalysis, Vol. 4, p 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in the Journal of Catalysis, Vol. 61, p. 395.

The resultant zeolite containing gallium may be combined with binders or matrix materials which increase its strength, and resistance to attrition under severe conditions of use. Silica, alumina, and silica-alumina are generally used as binders although various clays conventionally used for the purpose may act as the binder. The amount of catalyst can comprise 1 to 90% by weight based on the composition including binder and preferably 20 to 70% by weight based on said composition.

The catalyst of the invention can be used in hydrocarbon conversion processes. In such conversions, the LHSV of the feed ranges from 0.1 to 20; the temperature ranges from 700° to 1200° F.; the pressures range from subatmosperic to 1000 psig.

The catalyst of the invention may be used in aromatization processes with feedstocks containing aromatizable components and/or reforming in which the LHSV ranges from 0.3 to 100; the temperature ranges from 750° to 1200° F. and the pressure ranges from 0.01 atmospheres to 1000 psig.

The catalyst of the invention can be used in catalytic cracking processes for upgrading petroleum crude fractions, particularly gas oil and resids. In accordance with the invention, catalytic cracking can be undertaken in the absence of purposefully added hydrogen under conditions of temperature ranging from 750° to 1200° F., preferably from 800° to 1100° F.; pressures from 0 to 100 psig preferably from 0 to 50 psig; weight hourly space velocity (WHSV) ranging from 0.1 to 200 $hr^{-1}$, preferably from 0.5 to 100 $hr^{-1}$; cat/oil (feed) ratios ranging from 0.5 to 20, preferably from 1 to 10. The catalyst may be used in fluid bed catalytic cracking or moving bed catalytic cracking processes. Although hydrogen is not necessarily purposefully added to the catalytic cracking process because of the high selectivity of the process for hydrogen production hydrogen will be present during the process.

EXAMPLES

EXAMPLE 1

About 500 g of the Z-14US powder was pelleted into about 3×13 mm discs and then column exchanged twice with 1.0M ammonium nitrate (pH about 4.6, 5:1 vol/wt ratio) at room temperature for 3 hours, washed with distilled water (10 volumes), and dried at 120° C. to obtain an $NH_4USY$ with 0.51 wt % sodium and 0.106 meq/g(ash)$NH_4$. The alpha activity was determined to be 309, a significant increase over the parent Z-14 which had an alpha activity of 3.7.

Thereafter, the low sodium $NH_4USY$ was steamed at 649° C. with air flowing, then steam for the time specified and cool down again with dry air. This steaming reduced the alpha activity to 6.9. The steamed zeolite was exchanged once with 1.0M ammonium nitrate (5:1 vol/wt) for 3 hours at room temperature washed with distilled water and dried at 120° C. The sodium content dropped to 0.25 wt %, while the alpha activity increased to 42.

The steamed $NH_4USY$ was then extracted with 1.0N nitric acid (5:1 vol/wt) for 3 hours at room temperature using the column exchanger. The pH of the circulating acid was 0.8 at the end of extraction. The acid solution was drained from the system, the zeolite washed twice with 10 volumes of distilled water, and then ion exchanged with 1.0M ammonium nitrate as described above. The exchange solution was allowed to contact the zeolite through the weekend prior to washing and then drying at 120° C. These procedures dealuminized the zeolite to a bulk silica:alumina ratio of 11.3:1, reduced the sodium content to 0.11 wt %, and increased the alpha activity to 92. The acid extracted $NH_4USY$ dealuminations can be illustrated by reviewing the following Table entitled Dealuminization of Z-14USY:

| Dealuminization of Z-14USY | | | |
|---|---|---|---|
| | $SiO_2/Al_2O_3$ Bulk | Å (Angstroms) | Sodium wt % | Alpha Activity |
| as-received | 5.0 | 24.52 | 2.57 | 3.7 |
| $NH_4$ exchanged | 5.0 | 24.58 | 0.51 | 309 |
| steamed | 5.0 | — | (0.5) | 6.9 |
| steamed, $NH_4$ exchanged | 5.0 | 24.34 | 0.25 | 42 |
| $HNO_3$, extracted | 11.3 | 24.31 | 0.11 | 92 |
| steamed, $NH_4$ exchanged | 12.1 | 24.28 | 0.11 | 3.0 |
| $HNO_3$, extracted | 24.9 | 24.27 | 0.06 | 3.1 |

Steaming and acid extraction procedures on the partially dealuminized $NH_4USY$ were repeated. After steaming at 649° C. for 20 hours the alpha activity had dropped to 3.0. Acid extraction with the 1.0N nitric acid at room temperature increased the bulk $SiO_2/Al_2O_3$ ratio to 24.9:1, equivalent to 74% bulk dealuminization, while reducing the sodium content to 0.06 wt %. The alpha remained nearly constant at 3.1.

The steaming steps resulted in most of the reduction in unit cell parameter, with a corresponding increase in framework $SiO_2/Al_2O_3$ ratio. The nitric acid extraction removed primarily non-framework aluminum, with little effect on the unit cell parameter. However, acid extraction of non-framework aluminum increased the effectiveness of the second steaming for additional framework dealuminization. In addition, removal of additional sodium and possibly non-framework cationic aluminum species by acid extraction increased the alpha activity of the dealuminized USY zeolites.

The unit cell parameter for highly dealuminized Y zeolite is greater than that predicted by the Breck-Flanigen relationship (24.238 vs 24.191 with zero Al/UC). The dealuminized USY zeolites obtained after the first and second steaming and acid extraction procedures have framework $SiO_2/Al_2O_3$ ratios of about 47:1 and 135:1, corresponding to about 86% and 95% framework dealuminization, respectively, by this method.

EXAMPLE 2

The dealuminized USY above, resulting from the first dealumination extraction procedure, having a bulk $SiO_2/Al_2O_3$ ratio of 11.3 and a framework $SiO_2/Al_2O_3$ ratio 63 and a unit cell parameter of 24.31 (as determined by X-ray) with a 96% crystallinity relative to the parent, was employed for framework gallium insertion.

The [Ga]USY sample was prepared by refluxing 1.0 g of the dealuminized USY with $Ga_2(SO_4)_3$, (0.25 g gallium sulfate/gram of zeolite) in 50 ml 0.2N NaOH solution for 2 hours. The product was filtered, washed, dried and $NH_4^+$ exchanged. Calcination was performed at 1° C./min to 538° C. for four hours in air. The $^{71}Ga$ MAS NMR spectrum of the $NH_4$ [Ga]USY was obtained on the 200 MHz spectrometer using a 3.4 μs pulse with the solution 90°=6 μs, a recycle time of 70 ms, and 774,473 scans. No proton decoupling was used. Spectral signal/noise was enhanced with 200 Hz exponential line broadening. The chemical shift is referenced to a 1M solution of $Ga(NO_3)_3$. The $^{71}Ga$ MAS spectrum was quantitated against a solid sample of gallium nitrate. The 52 MHz $^{27}Al$ NMR quantitation was obtained using short 2.5 μs pulses with the solution 90°=5.7 μs and a 350 ms recycle. The [Ga]USY contained at least 2.2% framework gallium determined by this NMR method.

The [Ga]USY contained 2.4% gallium elemental analysis indicating that at least 92% of the gallium was incorporated into the zeolite framework.

The FIG. 1 is an X-ray diffraction pattern of the [Ga]USY and the parent materials. The [Ga]USY is highly crystalline. Treatment with base alone resulted in amorphous material. The shift in 2 theta compared to the parent indicates an increase in framework aluminum and/or gallium content, with a corresponding increase in the unit cell parameter. Not only gallium but also some of the non-framework aluminum resulting from the dealuminization process, was incorporated back into the framework of the zeolite by the caustic treatment. The overall $SiO_2/(Ga_2O_3+Al_2O_3)$ ratio of 18 obtained is substantially higher than obtainable by direct synthesis, reported by G. H. Kuehl, "Preparation of Gallosilicate Faujasite in the Presence of Phosphate", *J. Inorg. Nucl. Chem.*, 1971, Vol. 33, pp3261-3268.

Figure 2:
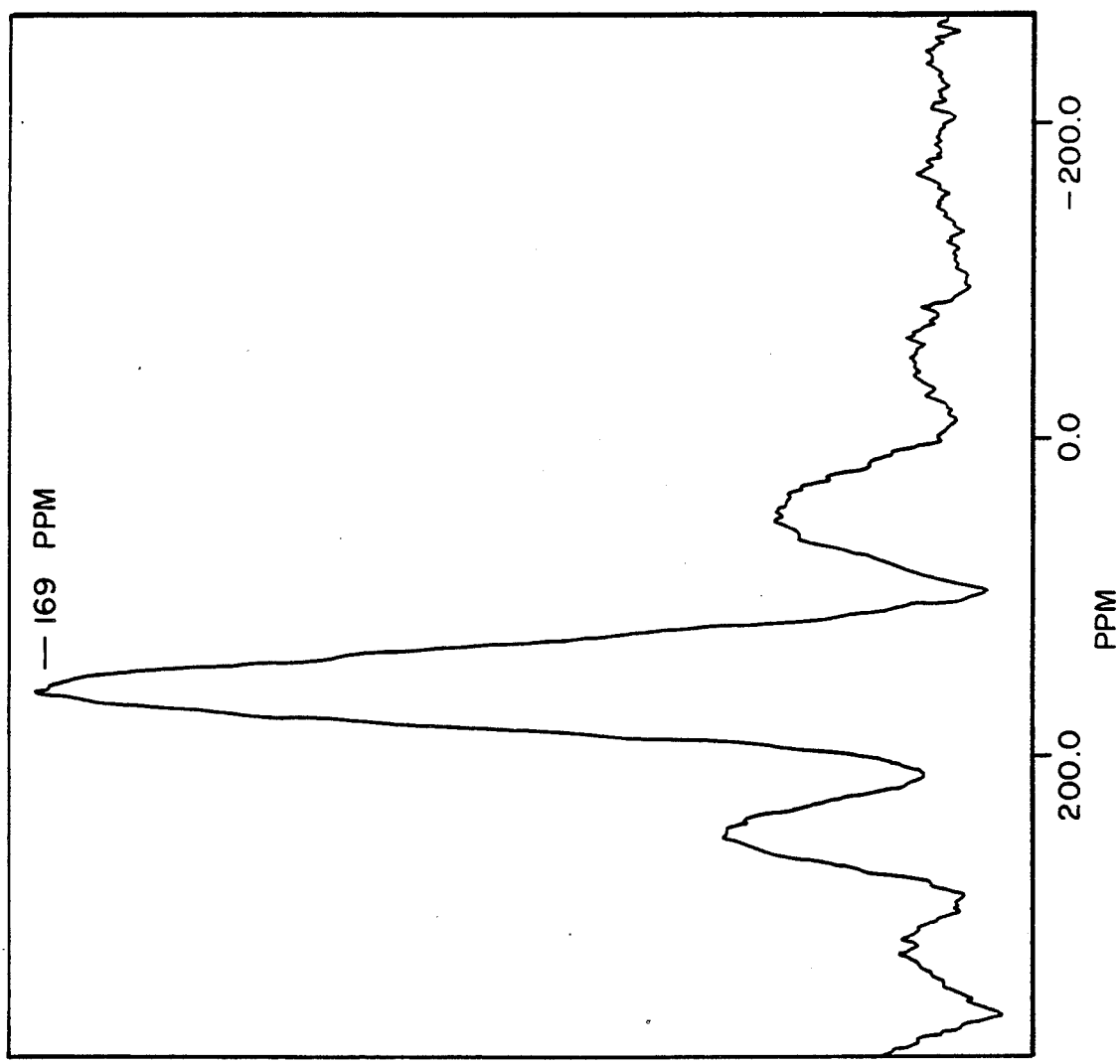
FIG. 2 is 200 MHz $^{71}GA$ MAS NMR Spectrum of [Ga] USY, obtained using 774,473 scans, 3.4μ pulses, and 70 ms recycle.

The $^{71}Ga$ MAS NMR of FIG. 2 shows a single peak at 169 ppm for the [Ga]USY sample. Tetrahedral Ga in the framework of zeolites has been observed in the region of 150 to 180 ppm. Framework Ga in $NH_4$—ZSM-5 and zeolite beta occurs at ~155 ppm. Similar to the NMR results for Al in ZSM-5 and Y, the tetrahedral framework Ga in Y zeolite is downfield of the Ga in the framework of ZSM-5. From the 174 ppm Ga shift for the [Ga]USY sample at 500 MHz, the quadrupole coupling constant for the Ga is calculated to be ~900 kHz and the isotropic shift 175 ppm. Although the broader peaks for Ga in comparison to Al make the error in NMR quantitation for Ga greater than for Al, the 2.19 wt % framework Ga determined for the Y sample by NMR is in good agreement with the elemental analysis result of 2.38 wt %. Non-framework Ga is not observed at 200 MHz. The narrowness of the Ga peak and the agreement with elemental analysis indicate that most of the gallium exists in tetrahedral sites in the [Ga]USY framework.

Various modifications and alterations of this invention will become apparent to those skilled in the art without departing from the scope and spirit of this invention, which is defined by the claims appended hereto.

What is claimed is:

1. A hydrocarbon conversion process for upgrading a petroleum feedstock, comprising aromatizable compounds comprising contacting the feedstock with a catalyst, under hydrocarbon conversion conditions wherein the LHSV of the feed ranges from 0.1 to 20; the temperature ranges from 120° to 1200° F.; the pressures range from subatmospheric to 3000 psig, and added hydrogen can be present up to 20:1 $H_2$/hydrocarbon mole ratio, and converting said aromatizable compounds, wherein the catalyst consists essentially of ultrastable Y having a framework (silica:alumina+gallium oxide) mole ratio $SiO_2/(Al_2O_3+Ga_2O_3)$ ratio ranging from 10 to 500, a framework gallium content ranging from 0.1 to 5 weight %, a unit cell parameter of 24.25 to 24.50, wherein the ultrastable Y has acidic sites which are protonated; and wherein the catalyst is produced by the process of steaming ultrastable Y having a framework silica:alumina ratio of less than 10, at a temperature above 600° C.; ammonium ion exchanging the steamed ultrastable Y; and treating the ammonium ion exchanged ultrastable Y with a mineral acid; recovering the mineral acid treated ultrastable Y and subjecting it to a soluble source of gallium at a pH of greater than 7.

2. The process of claim 1, wherein the catalyst is produced by the process which further includes, after recovering the mineral acid treated ultrastable Y and before subjecting it to a soluble source of gallium, steaming the mineral acid treated ultrastable Y; ammonium ion exchanging the steamed mineral acid treated ultrastable Y and treating the ultrastable Y for a second time with mineral acid.

3. The process of claim 2, wherein the alpha value of the ultrastable Y ranges from 0.1 to 1000.

4. A process for increasing the aromatic content of a petroleum feedstock containing aromatizable components which comprises contacting the feedstock with a catalyst under conditions wherein the LHSV ranges from 0.3 to 100; the temperature ranges from 750° to 1200° F. and the pressure ranges from 0.01 atmospheres to 1000 psig, to convert said aromatizable components, wherein the catalyst consists essentially of ultrastable Y having a framework (silica:alumina+gallium oxide) mole ratio $SiO_2/(Al_2O_3+Ga_2O_3)$ ratio ranging from 10 to 500, a framework gallium content ranging from 0.1 to 5 weight %, a unit cell parameter of 24.25 to 24.50, wherein the ultrastable Y has acidic sites which are protonated; and wherein the catalyst is produced by the process of steaming ultrastable Y having a framework silica:alumina ratio of less than 10, at a temperature above 600° C.; ammonium ion exchanging the steamed ultrastable Y; and treating the ammonium ion exchanged ultrastable Y with a mineral acid; recovering the mineral acid treated ultrastable Y and subjecting it to a soluble source of gallium at a pH of greater than 7.

5. The process of claim 4, wherein the catalyst is produced by the process which further includes, after recovering the mineral acid treated ultrastable Y and before subjecting it to a soluble source of gallium, steaming the mineral acid treated ultrastable Y; ammonium ion exchanging the steamed mineral acid treated ultrastable Y and treating the ultrastable Y for a second time with mineral acid.

6. The process of claim 5, wherein the alpha value of the ultrastable Y ranges from 0.1 to 1000.

7. A reforming process for upgrading a naphtha feedstock containing aromatizable components comprising contacting the naphtha feedstock with a catalyst under conditions wherein the LHSV ranges from 0.3 to 100; the temperature ranges from 750° to 1200° and the pressure ranges from 0.01 atmospheres to 1000 psig, to convert said aromatizable components, to produce an effluent reformate of increased aromatic content compared to the naphtha feedstock, wherein said catalyst consists essentially of ultrastable Y having a framework (silica:alumina+gallium oxide) mole ratio $SiO_2/(Al_2O_3+Ga_2O_3)$ ratio ranging from 10 to 500, a framework gallium content ranging from 0.1 to 5 weight %, a unit cell parameter of 24.25 to 24.50, wherein the ultrastable Y has acidic sites which are protonated; and wherein the catalyst is produced by the process of steaming ultrastable Y having a framework silica:alumina ratio of less than 10, at a temperature above 600° C.; ammonium ion exchanging the steamed ultrastable Y; and treating the ammonium ion exchanged ultrastable Y with a mineral acid; recovering the mineral acid treated ultrastable Y and subjecting it to a soluble source of gallium at a pH of greater than 7.

8. The process of claim 7, wherein the catalyst is produced by the process which further includes, after recovering the mineral acid treated ultrastable Y and before subjecting it to a soluble source of gallium, steaming the mineral acid treated ultrastable Y; ammonium ion exchanging the steamed mineral acid treated ultrastable Y and treating the ultrastable Y for a second time with mineral acid.

9. The process of claim 8, wherein the alpha value of the ultrastable Y ranges from 0.1 to 1000.

10. A catalytic cracking process for upgrading either a gas oil or a resid each of said gas oil or resid containing aromatizable components by contacting said gas oil or said resid with a catalyst under conditions including the absence of purposefully added hydrogen under conditions of temperature ranging from 750° to 1200° F.; pressures from 0 to 100 psig; weight hourly space velocity (WHSV) ranging from 0.5 to 20, to convert said aromatizable components, wherein said catalyst consists essentially of ultrastable Y having a framework (silica:alumina+gallium oxide) mole ratio $SiO_2/(Al_2O_3+Ga_2O_3)$ ratio ranging from 10 to 500, a framework gallium content ranging from 0.1 to 5 weight %, a unit cell parameter of 24.25 to 24.50, wherein the ultrastable Y has acidic sites which are protonated; and wherein the catalyst is produced by the process of steaming ultrastable Y having a framework silica:alumina ratio of less than 10, at a temperature above 600° C.; ammonium ion exchanging the steamed ultrastable Y; and treating the ammonium ion exchanged ultrastable Y with a mineral acid; recovering the mineral acid treated ultrastable Y and subjecting it to a soluble source of gallium at a pH of greater than 7.

11. The process of claim 10, wherein said conditions include the absence of purposefully added hydrogen, a temperature ranging from 800° to 1100° F.; pressures from 0 to 50 psig; weight hourly space velocity (WHSV) ranging from 0.5 to 100 $hr^{-1}$; cat/oil (feed) ratios ranging from 1 to 10.

12. The process of claim 10, wherein the catalyst is produced by the process which further includes, after recovering the mineral acid treated ultrastable Y and before subjecting it to a soluble source of gallium, steaming the mineral acid treated ultrastable Y; ammonium ion exchanging the steamed mineral acid treated ultrastable Y and treating the ultrastable Y for a second time with mineral acid.

13. The process of claim 10, wherein the alpha value of the ultrastable Y ranges from 0.1 to 1000.

* * * * *